United States Patent [19]

Morita et al.

[11] 4,365,870
[45] Dec. 28, 1982

[54] ELECTROCHROMIC DISPLAY DEVICE

[75] Inventors: Hiroshi Morita, Machida; Keiko Miyai, Yokohama, both of Japan

[73] Assignee: Tokyo Shibaura Denki Kabushiki Kaisha, Kawasaki, Japan

[21] Appl. No.: 201,193

[22] Filed: Oct. 27, 1980

[30] Foreign Application Priority Data

Oct. 29, 1979 [JP] Japan .................. 54-138656

[51] Int. Cl.³ .............................. G02F 1/17
[52] U.S. Cl. ................................... 350/357
[58] Field of Search ......................... 350/357

[56] References Cited

U.S. PATENT DOCUMENTS

| 3,807,832 | 4/1974 | Castellion | 350/357 |
| 3,819,252 | 6/1974 | Giglia | 350/357 |
| 4,009,935 | 3/1977 | Faughnan et al. | 350/357 |
| 4,110,259 | 8/1978 | Sichel | 350/357 |

OTHER PUBLICATIONS

Sichel et al., "Transport and Optical Properties of Electrochromic Au-WO₃ Cermets", *Appl. Phys. Lett.*, 33 (7), Oct. 1 1978, pp. 564–566.

*Primary Examiner*—James W. Davie
*Attorney, Agent, or Firm*—Cushman, Darby & Cushman

[57] ABSTRACT

An electrochromic display device wherein a layer of electrochromic material is formed on a display electrode. A counter electrode is spaced apart from the display electrode, and the space therebetween is filled with an electrolyte. A cermet layer is formed on the counter electrode. The cermet layer consists of $WO_3$ and Ta.

2 Claims, 3 Drawing Figures

ELECTROCHROMIC DISPLAY DEVICE

This invention relates to an improvement of a display device utilizing electrochromic phenomenon.

Certain substances become colored if electric current flows therethrough, and this kind of coloring is called "electrochromic phenomenon". Substances exhibiting the electrochromic phenomenon are called "electrochromic materials". The color is removed by the flow of current in the reverse direction. In general, the electrochromic phenomenon is thought to accompany the formation of color centers or an oxidation-reduction reaction.

There are organic and inorganic electrochromic materials. U.S. Pat. No. 3,806,229 discloses a viologen salt as a typical organic electrochromic material. Also, U.S. Pat. No. 3,712,710 teaches oxides of transition metals such as tungsten oxide and molybdenum oxide as typical examples of inorganic electrochromic materials. In general, these metal oxides are used in combination with electrolytes such as sulfuric acid, phosphoric acid and lithium perchlorate solution.

Recently, an application of the electrochromic phenomenon to a display cell is widely attempted in this technical field. A conventional electrochromic display device generally comprises a display electrode, an electrochromic material layer formed on said display electrode, a counter electrode spaced apart from said display electrode, and an electrolyte disposed between said two electrodes.

When both of these electrodes are rendered electrically conductive in a display device of the construction described above, the coloration of the electrochromic material layer is effected so that the colored part may be discriminated from the non-colored part by an observer.

Since the electrochromic display device absorbs ambient light and provides a passive display of degraded optical density, it is advantageous in that the eyes of an observer do not become fatigued and wider visual angles are permitted while viewing the display device. Furthermore, the display device has a memory capacity so the display is maintained even after the power switch is turned off. Thus, application of this device to various fields is expected.

The surface of a counter electrode disclosed in U.S. Pat. No. 3,819,252 is covered with an electrochromic material layer. The display device having such a counter electrode is advantageous in that the response speed is faster than that of a display device of the construction wherein the counter electrode is exposed to the electrolyte. However, since an electromotive force (EMF) is generated between the electrochromic material layer on the counter electrode and the electrolyte, the voltage applied between the display electrode and the counter electrode is reduced by a value corresponding to the electromotive force. Furthermore, since the electromotive force changes with time, the voltage applied to the display electrode also changes with time so that undesirable irregular coloring and variations in the response speed may be generated. With such a conventional device, after leaving it to stand for a long period of time, for example, 24 hours, the optical density is degraded by about 10%.

It is, therefore, the primary object of the present invention to provide an electrochromic display device which is capable of eliminating the problems of the prior art display devices and of reducing and stabilizing the electromotive force (EMF).

To the above and other ends, the present invention provides an electrochromic display device comprising:
 a display electrode;
  an electrochromic material layer formed on said display electrode;
  a counter electrode spaced apart from said display electrode;
  an electrolyte disposed between said two electrodes; and
  a cermet layer formed on said counter electrode and consisting of an electrochromic material and a metal.

In the display device of the present invention, the metal contained in the cermet layer may be Ta, Au or a mixture thereof. The cermet layer preferably consists of $WO_3$ and Ta, and the amount of the metal contained in the cermet layer is 5–20 volume %.

This invention can be more fully understood from the following detailed description when taken in conjunction with the accompanying drawings, in which.

Figure 1:
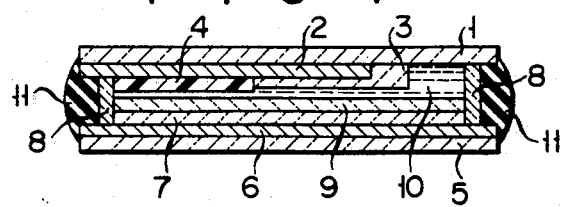
FIG. 1 is a sectional view of a display cell according to the present invention.

One embodiment of the present invention will be described referring to FIG. 1. A transparent electrically conductive layer 2 of indium oxide, tin oxide or the like of a desired pattern is formed on a display side base body 1 of a transparent material such as glass. A thin layer of tungsten oxide is formed thereover as an electrochromic coloring layer 3 by vacuum evaporation to a thickness of 0.35 $\mu$m at a display part for numerals, characters and patterns. A lead part is covered with a silicone resin 4. A tantalum thin film or the like is formed as a counter electrode 6 on the entire surface of a rear side glass base body 5. A cermet layer 7 of Ta-$WO_3$ to be described later is formed to a thickness of 0.2 $\mu$m on the counter electrode except the electrode part for connection to the outside. Both base bodies are spaced apart 1 mm by a glass spacer 8 and are securely fixed with silicon rubber 11 from the outside of the spacer 8. A porous layer 9 of white alumina ceramic as a display background is inserted above the cermet layer 7 of the counter electrode side. In a space 10 between the base bodies is sealed an electrolyte consisting of a 1 mol/l propylene carbonate solution of dehydrated lithium perchlorate. With a display cell of such a construction, a high contrast display of blue with a white background may be effected by applying a DC current of 2.0 V taking the display side transparent conductive layer 2 as negative and the counter electrode 6 as positive. This coloration disappears when the polarity of the applied voltage is reversed.

This device shows a memory capacity which enables maintenance of the display contents when the drive circuit is turned off during the display mode. The reduction in the optical density after 24 hours is negligible. Furthermore, the formation of the cermet layer on the counter electrode leads to regularity of the contrast within a cycle of coloration-left to stand-bleaching-left to stand-coloration, with varied memory durations and varied durations during which the device is left to stand.

In accordance with the present invention, the cermet layer formed on the counter electrode consists of electrochromic material and metal dispersed therein, the value of the electromotive force (EMF) generated between the electrolyte and the cermet layer is low, the change of the EMF with time is small, and charge exchange between the cermet layer and the electrolyte is easy. The device of the present invention is thus advantageous in that the response speed may be made faster.

Figure 2:
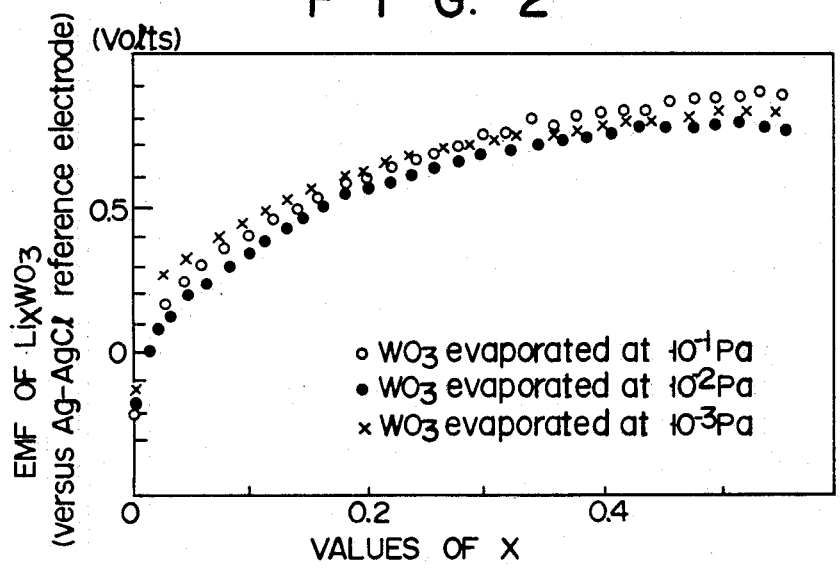
FIG. 2 is a characteristic view of the EMF generated between the deposited layer of the electrochromic material and the electrolyte.
Figure 3:
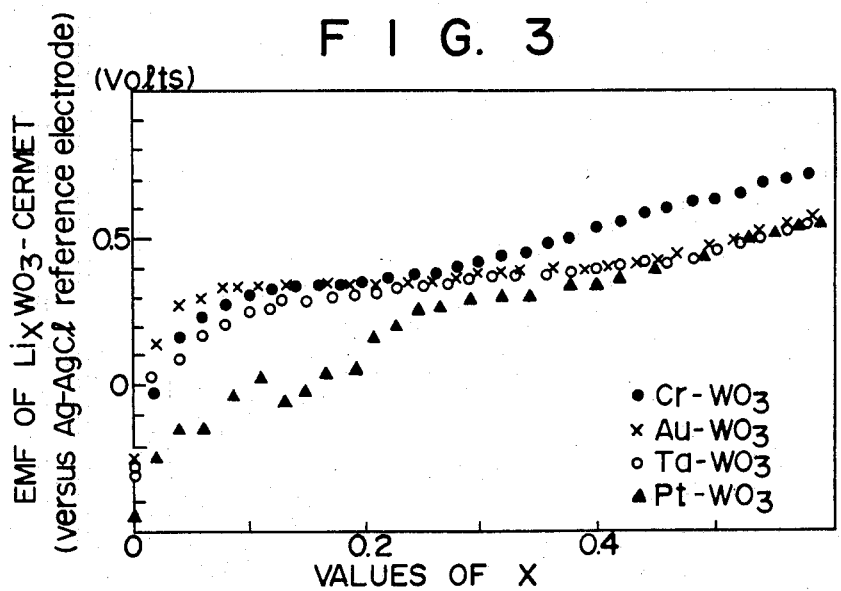
FIG. 3 is a characteristic view of the EMF generated between the cermet layer and the electrolyte.

FIG. 2 shows the electromotive force (EMF) generated between the deposited layer of the electrochromic material and the electrolyte as determined by experiment and FIG. 3 shows the electromotive force generated between the cermet layer and the electrolyte. Along the abscissa is plotted the amount of Li in the pure $WO_3$ layer and the cermet layer as x in the reaction formula of $WO_3 + xLi + xe^- \rightleftarrows Li_xWO_3$. Thus, the degree of coloration changes with changes in x. The rate of change of EMF of the cermet layer, especially of the $Au$-$WO_3$ layer and the $Ta$-$WO_3$ layer, with the change in x is smaller than in the case of the pure $WO_3$ layer. Especially when $0.1 < x < 0.5$, a relatively low, substantially constant EMF is maintained. It is thus seen that this range of x is preferable for an electrochromic display device in practice.

Since the charge amount $Q_o$ necessary for coloring and bleaching the electrochromic layer on the display electrode is 5 to 10 (mC/cm$^2$) x A (cm$^2$) (wherein A is the display area), the change $\Delta$ x of x in the cermet layer on the counter electrode due to the coloring and bleaching of the electrochromic layer on the display electrode in the above formula may be represented as $$\Delta x = \frac{Q_o}{e \cdot t \cdot B \cdot \rho}$$

wherein the area of the counter electrode is B (cm$^2$), the amount of $WO_3$ in the cermet layer per unit volume is $\rho$ the elementary electric charge is e (mC) and the film thickness is t (cm).

Therefore, it suffices to determine x to satisfy $$0.1 < x \pm \Delta x < 0.5$$

$$0.1 < x \pm \frac{Q_o}{e \cdot t \cdot B \cdot \rho} < 0.5$$

Therefore, $$0.1 + \frac{Q_o}{e \cdot t \cdot B \cdot \rho} < x < 0.5 - \frac{Q_o}{e \cdot t \cdot B \cdot \rho} \qquad (1)$$

It is seen that a preferable display device is obtained if the cermet layer on the counter electrode is colored to satisfy the relation (1). Among the cermet layers which were tested, those with Au or Ta dispersed in $WO_3$ were found to be preferable for the principle of the present invention. Further, the electrical conductivities under colored conditions were tested. The results revealed that a higher conductivity may be obtained and a small drop in the applied voltage may be obtained with Ta than with Au. Ta-$WO_3$ is thus preferable since the voltage is more effectively applied to the display electrode side.

The method of manufacturing the cermet layer used in the experiments will be described. It is conventionally known that a cermet layer may be obtained by mixed sintering of the metal with the metal oxide material, by simultaneous evaporation from two evaporation sources, by simultaneous sputtering from two sputtering sources or the like. The high frequency sputtering method was adopted in the present invention. More particularly, a small piece of tantalum plate was placed on a $WO_3$ sintered body, and the cermet layer was deposited on the substrate by sputtering. Other cermet layers may also be obtained by simultaneous sputtering of the respective metals with $WO_3$ in the same manner. A target of cermet in which a metal is mixed in advance may be prepared for sputtering.

In summary, the present invention is characterized in that the cermet layer is formed on the counter electrode. The present invention is advantageous in that coloring irregularity and variations in the response speed are eliminated, and the reduction in the optical density after leaving the device to stand for a long period of time is negligible.

What we claim is:

1. An electrochromic display device comprising:
a display electrode;
an electrochromic material layer formed on said display electrode;
a counter electrode spaced apart from said display electrode;
an electrolyte disposed between said two electrodes; and
a cermet layer formed on said counter electrode and consisting of $WO_3$ and Ta.

2. A device as claimed in claim 1, wherein the amount of Ta in the cermet layer is 5 to 20 volume %.

* * * * *